(12) United States Patent
Lässle et al.

(10) Patent No.: US 6,774,763 B2
(45) Date of Patent: Aug. 10, 2004

(54) APPARATUS FOR ACTIVATING AND/OR DEACTIVATING A SECURITY DEVICE

(75) Inventors: Hans-Peter Lässle, Usingen (DE); Dietmar Schmid, Villmar (DE)

(73) Assignee: Mannesmann VDO AG, Frankfurt (DE)

( * ) Notice: Subject to any disclaimer, the term of this patent is extended or adjusted under 35 U.S.C. 154(b) by 372 days.

(21) Appl. No.: 09/737,272

(22) Filed: Dec. 13, 2000

(65) Prior Publication Data

US 2001/0015694 A1 Aug. 23, 2001

(30) Foreign Application Priority Data

Dec. 16, 1999 (DE) .......................................... 199 60 781
Feb. 17, 2000 (DE) .......................................... 100 07 288

(51) Int. Cl.[7] ................................................ H04L 9/32
(52) U.S. Cl. ................... 340/5.26; 340/5.63; 340/5.28; 307/9.1; 70/278; 380/21
(58) Field of Search ............................. 340/5.26, 5.63, 340/5.28, 426.15; 384/43; 380/28, 49; 307/10.2, 10.3, 10.4; 180/287

(56) References Cited

U.S. PATENT DOCUMENTS 5,079,435 A * 1/1992 Tanaka ....................... 307/10.2
5,733,047 A * 3/1998 Furuta et al. .................. 384/43
5,774,065 A * 6/1998 Mabuchi et al. ......... 340/825.72

FOREIGN PATENT DOCUMENTS

| DE | 3636822 | 10/1987 |
|---|---|---|
| DE | 3616197 | 11/1987 |
| DE | 3905651 | 8/1990 |
| DE | 4308899 | 2/1994 |
| DE | 9304520 | 7/1994 |
| DE | 19958145 | 6/2001 |
| EP | 0983916 | 3/2000 |

OTHER PUBLICATIONS

Hutton B: "Code Catchers Caught Out. Overcoming the Security Risks Posed by Remote Keyless Entry"; New Electronics International Thomson Publishing, London, GB; Jul. 8, 1997 p. 41 XP000727683 ISSN; 0047–9624.

* cited by examiner

Primary Examiner—Michael Horabik
Assistant Examiner—Matsuichiro Shimizu
(74) Attorney, Agent, or Firm—Martin A. Farber

(57) ABSTRACT

An apparatus for activating and/or deactivating a security device, particularly an entry device for a motor vehicle, having a portable transmitter unit for wirelessly transmitting a coded information item which is received by a receiver apparatus and is compared with a prescribed coded information item, the receiver apparatus being capable of outputting an actuation signal to the security device if the two coded information items match, and wherein the codes of the transmitter unit and the receiver apparatus can be updated in terms of the currently coded information items to prevent unauthorized use of the motor vehicle.

8 Claims, 1 Drawing Sheet

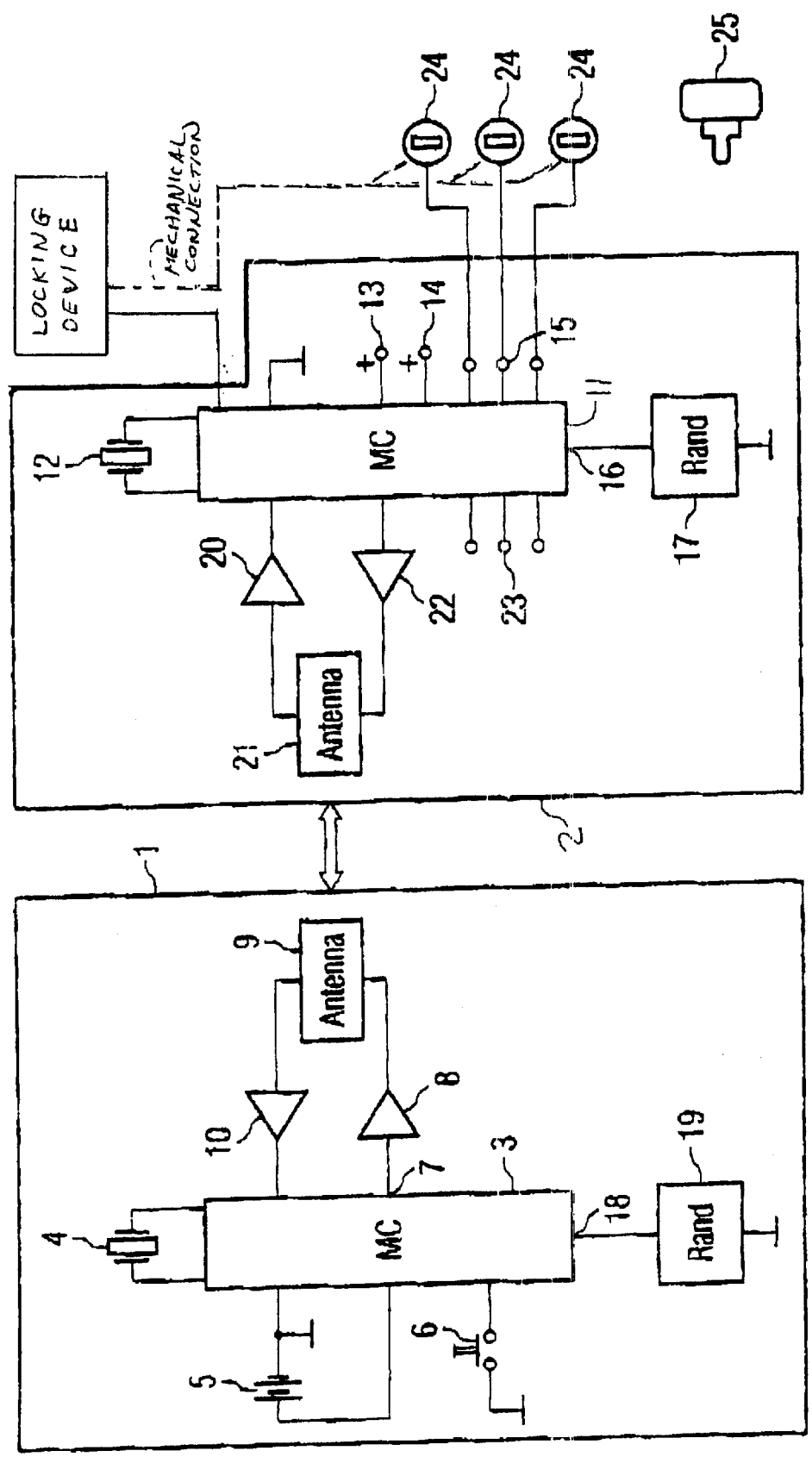

APPARATUS FOR ACTIVATING AND/OR DEACTIVATING A SECURITY DEVICE

FIELD AND BACKGROUND OF THE INVENTION

The invention relates to an apparatus for activating and/or deactivating a security device, particularly an entry device for a motor vehicle, having a portable transmitter unit for wirelessly transmitting a coded information item which is received by a receiver apparatus and is compared with a prescribed coded information item, the receiver apparatus being capable of outputting an actuation signal to the security device if the two information items match and the transmitter unit and the receiver apparatus being capable of being advanced in terms of the current coded information item.

Known apparatuses for activating and/or deactivating a locking system in a motor vehicle have a portable transmitter which, on request, transmits a coded information item to a receiver device which is permanently installed in the motor vehicle. The receiver device compares the transmitted coded information item with a prescribed information item which is generated in it. If the two information items match, the locking system is actuated by the receiver device.

So that it is still possible to operate the security device when the battery in the transmitter fails, for example, the receiver device is connected to a lock cylinder which can be operated mechanically using a key, which likewise activates or deactivates the security device.

Since, normally, only the remote control is used to actuate the locking system, it is necessary to ensure that only quite specific transmitters are able to unlock or lock a central locking system. The transmission protocols are therefore provided with a fixed allocation comprising a fixed code and an alternating code.

To calculate the respective next alternating code values, the same algorithm is used in the transmitter and in the receiver. In this context, the receiver has a so-called capture range for unlocking and locking, said capture range always permitting a plurality of future coded information items as being valid. The alternating code is changed in the transmitter by request; in the receiver, on the other hand, it is equated to that of the transmitter when a valid information item is received. Hence, if a plurality of coded information items from the transmitter do not reach the receiver, a permissible coded information item may be outside the capture range of the receiver and may thus not be recognized by the receiver.

Particularly when radio remote controls are used, where coded information items are transported over long ranges using a radio signal, interference within the transmission link may impair or completely interrupt the receiver's reception of the coded information item transmitted by the transmitter. Such interference can be produced deliberately in order to record the coded information items transmitted by the transmitter and use them to open the motor vehicle without authorization.

If a user operates the transmitter unit more than once, he may be led to believe that the security device is operating correctly, as a result of one of the tapped transmitter telegrams being transmitted to the receiver device by the tapping device in a tapping pause and triggering the expected reaction there, even though the transmitted message has not been transmitted by the authorized transmitter. The user therefore thinks that his vehicle is properly locked.

In the meantime, unauthorized persons can use the other tapped transmitter messages, which are more recent than the telegram transmitted by the tapping device, to gain entry to the motor vehicle.

SUMMARY OF THE INVENTION

The invention is thus based on the object of providing an apparatus for activating and/or deactivating a security device in which unauthorized deactivation of the device is reliably prevented.

The invention achieves the object by the feature that the transmitter unit and the receiver apparatus are automatically advanced n times after a prescribed interval, the prescribed interval being only insubstantially longer than the delay time for the signal carrying the coded information item from the transmitter unit to the receiver apparatus at a maximum range for the receiver apparatus.

The abrupt advancement of the valid coded information item ensures that all tapped signals are safely in the past and are recognized by the receiver apparatus as being invalid. This means that just a short time after the tapping attempt described above the code sequences stored in the tapping unit are regarded by the receiver apparatus as being past alternating code sequences which can no longer be used to open the vehicle. In this context, the prescribed interval is set such that the operator is still close to the vehicle.

Advantageously, the prescribed interval is started in the receiver device after a valid information item has been received, and is started in the transmitter unit after the transmission of a coded information item has ended.

To prevent the capture range of the receiver apparatus from being exceeded by the coded information item in the portable transmitter unit after a particular time, the code generator in the portable transmitter unit and the code generator in the receiver apparatus are advanced by the same number of steps.

Advantageously, the receiver apparatus is connected to a mechanical device which can be operated using a key, the receiver apparatus being disabled for the reception and/or evaluation of the coded information item and/or for the output of the actuation signal to the security device after the security device has been mechanically activated, the block being lifted after the security device has been mechanically deactivated.

This has the advantage that if the user establishes, after operating the transmitter a plurality of times, that the receiver is not reacting to the transmitted transmitter signals and the desired action cannot be carried out, he can deactivate the security device in the conventional manner by inserting the key into the lock cylinder and unlocking or locking the security device. However, since the radio remote control is put out of operation at the same time as this mechanical locking, this also reliably prevents tapped coded information items which have not yet been registered by the receiver from being able to be used to deactivate the security device. Only after mechanical deactivation of the security device does the radio remote control work in the customary manner again.

A coded information item transmitted from the transmitter to the receiver directly after the security device has been mechanically deactivated is used to shift all coded information items, possibly recorded beforehand, to the realms of the past, since the receiver, having received a valid information item from the transmitter, equates said information item to the one which is present in the receiver. This means that they are outside the capture range of the receiver, so that no actions can be triggered using these tapped coded information items.

This takes place particularly quickly and reliably if the receiver apparatus, having established that the security device has been mechanically deactivated, sends a stimulus signal to the portable transmitter unit for transmission of the coded information item.

Advantageously, the portable transmitter unit and the receiver apparatus each contain a code generator, the first code generator in the portable transmitter unit generating the coded information item which is to be transmitted, and the second code generator in the receiver apparatus generating the prescribed coded information item, both code generators operating on the basis of the same algorithm.

In this context, one or more respective random numbers which are independent of one another may be used as code, said random numbers being processed and compared with one another in the receiver on the basis of particular arithmetic rules.

BRIEF DESCRIPTION OF THE DRAWING

The invention supports numerous embodiments. One of these will be explained with the aid of the FIGURE shown in the drawing.

DETAILED DESCRIPTION OF THE PREFERRED EMBODIMENT

In a security device in the motor vehicle, for example a central locking device, a portable transmitter unit 1 contains a microcomputer 3 having an associated quartz oscillator 4 for clock signal generation.

The power supply used is a battery 5 which is in the form of a button cell in order to achieve a small physical size for the apparatus. A pushbutton switch 6 is used to turn on the transmitter apparatus 1. The microcomputer 3 is additionally connected to a random number generator 19.

The output 7 of the microcomputer 3 is connected to an antenna 9 via an amplifier 8 for the purpose of transmitting radio signals. For receiving radio signals, the antenna 9 is connected to the microcomputer 3 via a further amplifier 10.

The receiver apparatus 2 likewise has a microcomputer 11 having a quartz oscillator 12. The connection 13 is used to connect the microcomputer 11 to the motor vehicle's power source (terminal 13). The connection 14 is connected to the motor vehicle's ignition switch (terminal 15), so that the microcomputer 11 is actuated with each starting procedure. The inputs 15 of the microcomputer 11 are respectively associated with a locking apparatus 24 arranged in a door of the motor vehicle and can be used to actuate, the microcomputer 11 as a result of mechanical operation using a key 25 when normal operation of the control apparatus is disrupted. Connected to a further input 16 of the microcomputer 11, there is likewise a generator 17 generating a random pulse train. A transmission/reception antenna 21 is connected to the microcomputer 11 via an amplifier 20. Each of the three connections 23 of the microcomputer 11 is connected to a locking apparatus in the motor vehicle's central locking system and transmits the actuation signal output by the microcomputer 11.

The coded information item is formed using a fixed code and an alternating code. The alternating code is generated using the random number generated by the random number generator 19, 17 and using the algorithm stored in the microprocessor. The value of the alternating code is advanced in the portable transmitter unit 1 after a particular event.

In the receiver device 2, the values of the alternating code are split into permissible and impermissible values. In this context, the permissible values are always in the future and the impermissible values are always in the past or the present. The dividing line between these ranges is determined by the current value of the alternating code and by the capture range, the current value corresponding to the present and the capture range corresponding to a prescribed number of future information items among the coded information items which are to be transmitted.

The device operates as follows:

Operating the pushbutton switch 6 gives the microcomputer 3 in the portable transmitter unit 1 the instruction to start the algorithm for generating a coded information item, with a random number being supplied by the generator 19. The coded information item generated in this way is transmitted via the antenna 9 to the receiver 2 in the motor vehicle, where it is received by the antenna 21 and is passed on to the microprocessor 11. Once transmission of the coded information item has ended, the microprocessor 3 waits for a prescribed interval before advancing the alternating code in the transmitter unit 1 by n steps.

At the same time, the prescribed coded information item generated using the random number generator 17 is compared with the received coded information item in the microprocessor 11. If the two codings match, the microprocessor 11 supplies an actuation signal via the connections 23 to the door locks in the motor vehicle's central locking system in order to lock the doors.

The microprocessor 11 in the receiver device 2 also advances the capture range, likewise by n values, after the prescribed interval has elapsed after a valid information item has been received. If radio signals are used, the prescribed interval is in the seconds range. However, the interval is chosen to be so short that coded information items not transmitted directly from the transmitter unit to the receiver are always regarded by the receiver as being in the past when the operator has moved away from the vehicle.

Should the reception of the receiver 2 now be disrupted and the user of the portable transmitter unit 1 not detect any reaction from the motor vehicle, despite operating the pushbutton 6 a plurality of times, he will use a key 25 to activate the locks 24 in the central locking system and lock the vehicle that way. The microprocessor 11 in the receiver 2 detects this via the connections 15. In response to this mechanical locking of the motor vehicle, the microprocessor 11 disables evaluation of the signals arriving via the antenna 21 after locking, so that no actuation signals are output to the security device via the connections 23 as a result of wirelessly transmitted signals.

If the radio remote control is now to be activated again, the key 25 is again used to unlock the lock cam switch and hence the vehicle door, which the microprocessor 11 detects via the connections 15. In this case, the receiver apparatus is activated for the incoming coded information items while the doors are unlocked at the same time.

To prevent tapped coded information items which have not yet been evaluated by the receiver from causing the central locking system to be actuated, a coded information item is transmitted from the transmitter unit 1 to the receiver apparatus 2 immediately after mechanical unlocking. This has the effect of advancing the algorithm in the transmitter unit 1 and in the receiver apparatus 2. The direct transmission of a current coded information item is performed by the portable transmitter unit 1 after receiving a stimulus signal which is transmitted by the receiver apparatus 2 on account of the vehicle doors having been unlocked.

Alternatively, the system may also be designed such that radio reception is disabled once again after mechanical locking, while, when locking by radio, the possibly recorded codes become invalid.

If the receiver apparatus 2 now receives radio signals which were output by the transmitter unit 1 before the receiver apparatus 2 was blocked, these radio signals are no longer in the capture range of the receiver apparatus 2, and hence also cannot be used to activate or deactivate the locking apparatus.

We claim:

1. An apparatus for activating and/or deactivating a security device, particularly an entry device for a motor vehicle, the apparatus having a receiver apparatus and a portable transmitter unit for wirelessly transmitting a coded information item which is received by the receiver apparatus; wherein the transmitter unit and the receiver apparatus each comprise a number generator and a microcomputer operative in accordance with an algorithm to provide a fixed code and an alternating code; the microcomputer of the receiver apparatus comparing the transmitted coded information item with a reference coded information item, the receiver apparatus outputting an actuation signal via the microcomputer of the receiver apparatus to the security device when the two information items match, the microcomputers of the transmitter unit and the receiver apparatus being advanced along stages of the algorithm in terms of said coded information items, wherein a sequence of values in the alternating code in both the transmitter unit and the receiver apparatus are automatically advanced in the procedure of the algorithm by a number of times n, wherein n is greater than one, after a prescribed interval following a transmission of coded information items from the transmitter unit to the receiver apparatus, the prescribed interval being only insubstantially longer than a delay time for a signal carrying the coded information item from the transmitter unit to the receiver apparatus at a maximum range for the receiver apparatus.

2. The apparatus as claimed in claim 1, wherein said prescribed interval is started in the receiver apparatus after a valid coded information item has been received.

3. The apparatus as claimed in claim 1, wherein the prescribed interval is started in the transmitter unit after transmission of a coded information item has ended.

4. The apparatus as claimed in claim 1, further comprising a code generator (19) in the portable transmitter unit (1) and a code generator (17) in the receiver apparatus (2), said code generators are advanced by the same number of steps.

5. The apparatus as claimed in claim 1, wherein the receiver apparatus is connected to a mechanical device which is operable by use of a key, the mechanical device serving to mechanically activate and to mechanically deactivate the security device; and wherein mechanical activation of the security device introduces a blockage on the receiver apparatus (2) to be disabled for reception and/or evaluation of the transmitted coded information item and/or for the output of the actuation signal, the blockage being lifted by a mechanical deactivation of the security device.

6. The apparatus as claimed in claim 4, wherein a coded information item is transmitted from the portable transmitter unit (1) to the receiver apparatus (2) directly after the security device has been mechanically deactivated.

7. The apparatus as claimed in claim 5, wherein said receiver apparatus (2), having established that the security device has been mechanically deactivated, sends a stimulus signal to the portable transmitter unit (1) for transmission of the coded information item.

8. The apparatus as claimed in claim 1, wherein the portable transmitter unit (1) and the receiver apparatus (2) each contain a code generator (19, 17), a first of said code generators (19) in the portable transmitter unit (1) generating the coded information item which is to be transmitted, and a second of said code generators (17) in the receiver apparatus (2) generating the prescribed coded information item, both said code generators (19, 17) operating on basis of a same algorithm.

* * * * *